United States Patent [19]

Sagady

[11] 4,136,982

[45] Jan. 30, 1979

[54] CENTERED FASTENER ASSEMBLY

[75] Inventor: Daniel V. Sagady, Saginaw, Mich.

[73] Assignee: General Motors Corporation, Detroit, Mich.

[21] Appl. No.: 839,373

[22] Filed: Oct. 4, 1977

[51] Int. Cl.² ............................ F16B 7/10; F16D 1/12
[52] U.S. Cl. ...................................... 403/108; 403/359
[58] Field of Search ................. 403/359, 108; 277/161

[56] References Cited

U.S. PATENT DOCUMENTS

| 2,170,970 | 8/1939 | Johnston | 277/161 |
|---|---|---|---|
| 2,349,903 | 5/1944 | Fall | 277/161 |
| 3,832,076 | 8/1974 | Gehrke | 403/359 |
| 3,865,499 | 2/1975 | Flichy | 403/359 |
| 3,992,117 | 11/1976 | Ristau | 403/359 |

FOREIGN PATENT DOCUMENTS

| 147907 | 9/1931 | Switzerland | 277/161 |
|---|---|---|---|
| 780649 | 8/1957 | United Kingdom | 277/161 |

*Primary Examiner*—Wayne L. Shedd
*Attorney, Agent, or Firm*—Charles R. White

[57] ABSTRACT

Telescoping parts which are adapted to be secured together by a snap ring centered by special metallic spring construction which yieldably holds the snap ring in optimum position to facilitate the telescopic assembly of the two parts.

2 Claims, 6 Drawing Figures

CENTERED FASTENER ASSEMBLY

This invention relates to fasteners and more particularly to a new and improved fastener assembly comprising a snap ring centered in a retaining groove by a metallic spring construction to facilitate the telescopic assembly of two parts and to insure their subsequent retention in a fixed axial relationship.

Prior to the present invention, various spring detent devices have been employed to retain mating components in fixed axial positions. One such fastener device is provided by a resilient C-shaped snap ring construction fitted into a retainer groove of a first part. This part is subsequently telescoped into a mating opening in a second part causing the snap ring to deflect into its retainer groove until alignment is reached with a corresponding groove of the second part. At this point the snap ring will deflect into the corresponding groove to thereby connect the two parts together. With such fasteners, some assembly difficulties have been encountered since an off center ring carried by one part will abut and interfere with a mating part and require manual centering before the parts are telescoped together. This detracts from efficient and rapid assembly necessary for high volume production and generally detracts from use of snap ring fastener devices.

Prior to the present invention, rubber rings have been proposed as centering devices for snap rings. However, the use of such rings is limited in view of their low volume modulus of elasticity and the tendency of the centering rings to deform or bulge into the sides of their grooves adding to the required force for installation. Also, such rings are often adversely affected by temperature extremes, petroleum products and other material which severely detracts from their operation and service life. With this invention there is provided an improved all-metallic snap ring assembly incorporating a one piece metal spring which is capable of long service in environments suitable for the snap ring and which insures relative concentricity between the snap ring and the circumference of the groove within which it is confined.

In the preferred embodiment of the invention, the centering spring is provided by a one-piece wire spring element having free ends which is adapted to fit within a groove in a first member to provide a force at spaced contact point on a metallic snap ring to urge the ring radially to a centered position with respect to a first member to facilitate its insertion of a first part with respect to a second part. The second part has a groove which is adapted to align with and accommodate the snap ring as it springs to its free state. With the snap ring operatively disposed in both grooves, the two components are maintained in axial relationship. With this invention, the centering snap ring assembly can be readily installed in a radial groove formed in a shaft or bore. The spring device will urge a shaft mounted snap ring radially outwardly to a centered position and a bore mounted snap ring radially inwardly to a centered position. This invention effectively eliminates manual centering and facilitates quick assembly of a wide range of mating components.

It is a feature, object and advantage of this invention to provide a new and improved snap ring fastener assembly facilitating the telescopic assembly of mating members and their retention in predetermined axial relationship.

Another feature, object and advantage of this invention is to provide a new and improved fastener assembly in which a circular snap ring is centered in inwardly or outwardly extending radial grooves of telescoping parts by a waved metallic spring to facilitate assembly of a first part to a second part.

Another feature, object and advantage of this invention is to provide a new and improved centering spring for a snap ring comprising a one-piece metal spring band having spaced arcuate contact with the circumferential wall of a retainer groove and with a circumferential edge of a snap ring to urge it outwardly of its mounting groove to a centered position with respect to a supporting member.

These and other features, objects and advantages of this invention will become more apparent from the following detailed description and drawings in which.

Figure 1:
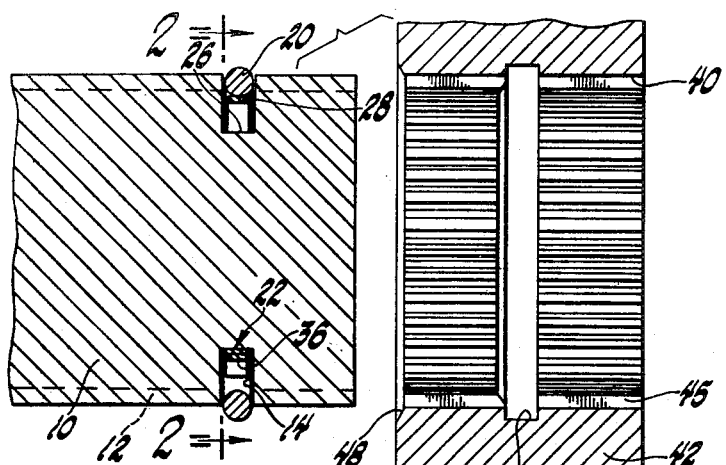
FIG. 1 is a sectional view of splined first and second components to be joined and axially retained with the centered snap ring construction of this invention.
Figure 2:
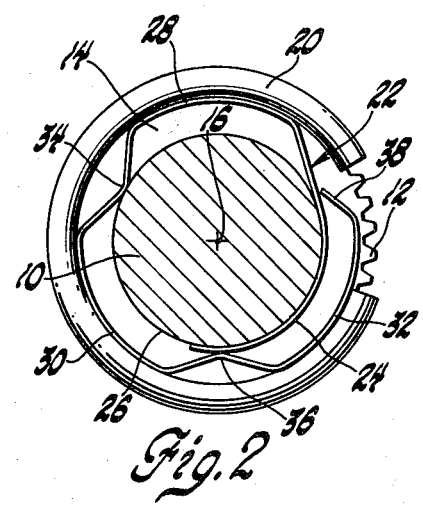
FIG. 2 is a sectional view taken on lines 2—2 of FIG. 1.

Referring now in greater detail to the drawings, there is shown in FIG. 1 a cylindrical shaft 10 having longitudinally extending external splines 12 and an annular groove 14 circling the central axis 16 of the shaft adjacent to one end thereof. Groove 14 has a round wire snap ring 20 generally C-shaped in side view disposed therein. Located internally of snap ring 20 is a special centering spring 22 preferably formed from flat metal spring stock. As shown, spring 22 has an arcuate inner segment 24 disposed on a corresponding arcuate portion of the inner annular bottom surface 26 of the groove 14. From the inner segment 24, the spring 22 extends radially in spaced wave form against spaced inner arcuate surfaces of the snap ring 20 with waves or lobes 28, 30, 32 separated by inwardly extending contact portions 34, 36 and 38 which project inwardly respectively into contact with the bottom surface 26 of the groove 14 or the arcuate portion 24 of the spring 20. With the spaced waves or lobes being substantially equal and engaging the inner surface of the snap ring and with the spring grounded at spaced point on the bottom surface 26 of groove 14, the snap ring 20 will be effectively centered. With the snap ring yieldably held in a centered position, shaft 10 is ready for installation into an internally splined opening 40 of a member 42 as shown in FIG. 1. Member 42 has a centralized annular groove 44 extending radially outwardly from the splines 45. Groove 44 corresponds with the groove 14 of the shaft 10, and on their alignment receives the outer portion of the snap ring 20.

Figure 3:
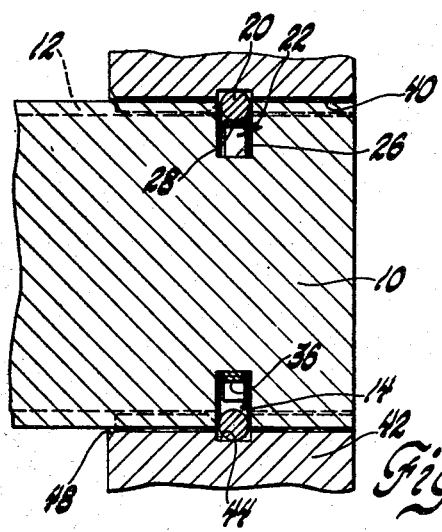
FIG. 3 is a view similar to FIG. 1 showing the components coupled together.
Figure 4:
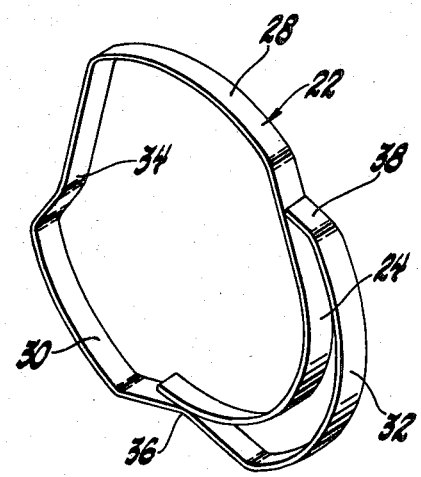
FIG. 4 is a perspective view of the preferred centering spring of this invention.

After the initial alignment of shaft 10 and the member 42 so that their splines mesh with each other, the two parts are telescoped. On reaching the chamfered entrance 48 of the groove, the spring 22 will be deflected radially inwardly so that the snap ring 20 is flush with the internal diameter of the member 42. Thus, on insertion of shaft 10 into the member 42, the snap ring deflects radially inwardly without binding of the centering spring. When the shaft 10 reaches the FIG. 3 position, the grooves 44 and 14 are in radial alignment and the snap ring cleared of the constricting splines 45 will spring outwardly toward its free state into engagement with the outer circumferential wall of the groove 44. The centering force of spring 22 may be selected to supplement the force of the snap ring to significantly increase the strength of the axial connection of member 10 and 42 or if a low force is desired, the centering force can be very slight. In any event, as will appear from FIG. 3, the snap ring being disposed in a locking position in the aligned grooves prevents the axial withdrawal of the members 10 and 42 relative to one another. If sufficient force is exerted, it will be appreciated that the force of the snap ring can be overcome to insure that the parts can be disassembled.

Figure 5:
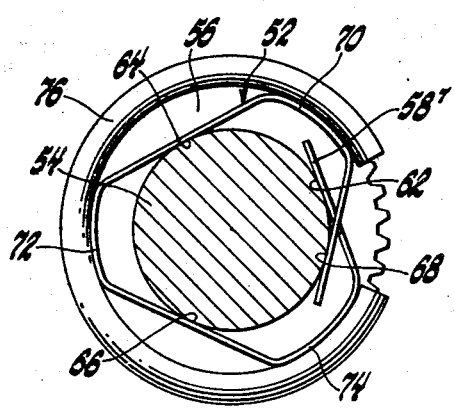
FIG. 5 is a sectional view similar to that of FIG. 2 showing a second embodiment of this invention.
Figure 6:
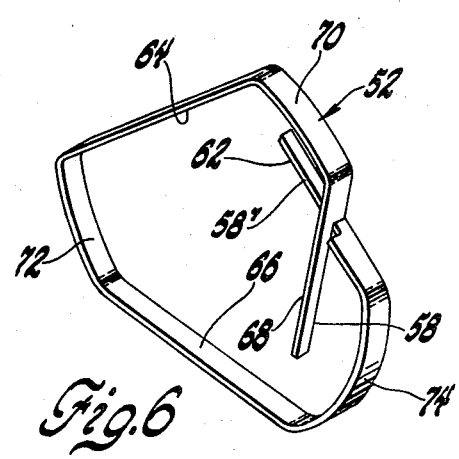
FIG. 6 is a perspective view of the centering ring of the second embodiment.

FIGS. 5 and 6 illustrate another embodiment of the invention which comprises a one-piece centering spring 52 of flat metallic spring stock. As in the first embodiment, this spring is adapted to surround a shaft 54 and fit within a radial annular retainer groove 56 which corresponds to the groove 14 of the first embodiment. The free ends of the spring are relieved at 58 and 58' as shown in FIG. 6 so that they cross one another and the spring can fit into the plane of the groove 56. With this construction, the spring can be constricted without any binding tendencies. As in the previous embodiment, the spring makes a point contact at a number of arcuately spaced peripheral points 62, 64, 66 and 68 with the bottom wall of slot or groove 56. Radially and arcuately spaced arms 70, 72 and 74 contact the inner annular surface of the snap ring 76 to center the snap ring in its operative position to facilitate insertion of shaft 54 into a corresponding opening of a second member.

While the snap ring construction has been shown adjacent to one end of a shaft 10, it will be appreciated that it could readily be located at a midpoint or at any position along the length of shaft 10 in view of the ease in which the centering spring and snap ring can be installed. Furthermore, it will be understood that the snap ring could be easily centered within the groove 44 of member 42 with the centering spring internal of the snap ring to center it within member 42 for assembly on a splined shaft. It will also be appreciated that this invention has provided a metallic new centering spring for snap rings which has a long service life comparable to that of the snap ring itself.

While a preferred embodiment of this invention has been shown and described to illustrate the invention, other embodiments will now become apparent to those skilled in the art. Accordingly this invention is not limited to the particular embodiments shown and described, but only by the following claims.

What is claimed is:

1. A centered retainer assembly for connecting first and second members together in a fixed axial position, said first member having a generally cylindrical extension that telescopes and fits into a corresponding cylindrical opening formed in said second member, said extension and said opening each being formed with a radially extending and annular groove transversely disposed with respect to the longitudinal axis of said members, said grooves being radially aligned with each other in response to the telescopic movement of said extension into said opening in said second member to a predetermined position, said retainer assembly comprising a curved spring member and a curved resilient snap ring radially disposed with respect to each other operatively mounted in one of said grooves, said spring contacting said last mentioned groove at a plurality of arcuately spaced stations along the bottom of said groove, said spring having a plurality of radially projecting arms contacting said snap ring at a plurality of arcuately spaced peripheral stations to exert a low spring force thereon and to yieldably hold said snap ring in a centered and radially projecting position with respect to said last mentioned groove to facilitate insertion of said extension into said opening, said spring readily constricting in response to deflection of said snap ring by the wall defining said cylindrical opening in response to the telescopic movement of said extension into said opening until said predetermined position is reached at which position said snap ring deflects partially into the other of said grooves to thereby axially secure said members to each other.

2. A centered retainer assembly for connecting first and second members in axial relationship with respect to one another, one of said members having a generally cylindrical extension that telescopes and fits into a corresponding cylindrical opening formed in the other of said members, each of said members being formed with a radially extending and annular groove that extends transversely with respect to the longitudinal axis of said members, said grooves being radially aligned with each other in response to the telescopic movement of said members into a predetermined position with respect to one another, said retainer assembly comprising a curved spring member and a resilient C-shaped snap ring circular in cross section, said spring member being disposed radially with respect to said snap ring and being operatively mounted in said groove in said first member, said spring contacting said last mentioned groove at a plurality of spaced contact points in the bottom of said last mentioned groove and having a plurality of radially projecting arms contacting said snap ring at a plurality of arcuately spaced peripheral stations to exert a low spring force thereon to yieldably hold said snap ring in a centered and radially projecting position with respect to said last mentioned groove so that said snap ring will be deflected into said last mentioned groove in response to the telescoping insertion of one of said members into the other and to the direct engagement of said snap ring with said second member alignment of said grooves and the retention of said members by said snap ring as it deflected to a centered position with respect to both of said grooves.

* * * * *